Aug. 15, 1967 M. MARKS 3,336,438
CHROMINANCE TAKEOFF CIRCUIT
Filed Aug. 23, 1965
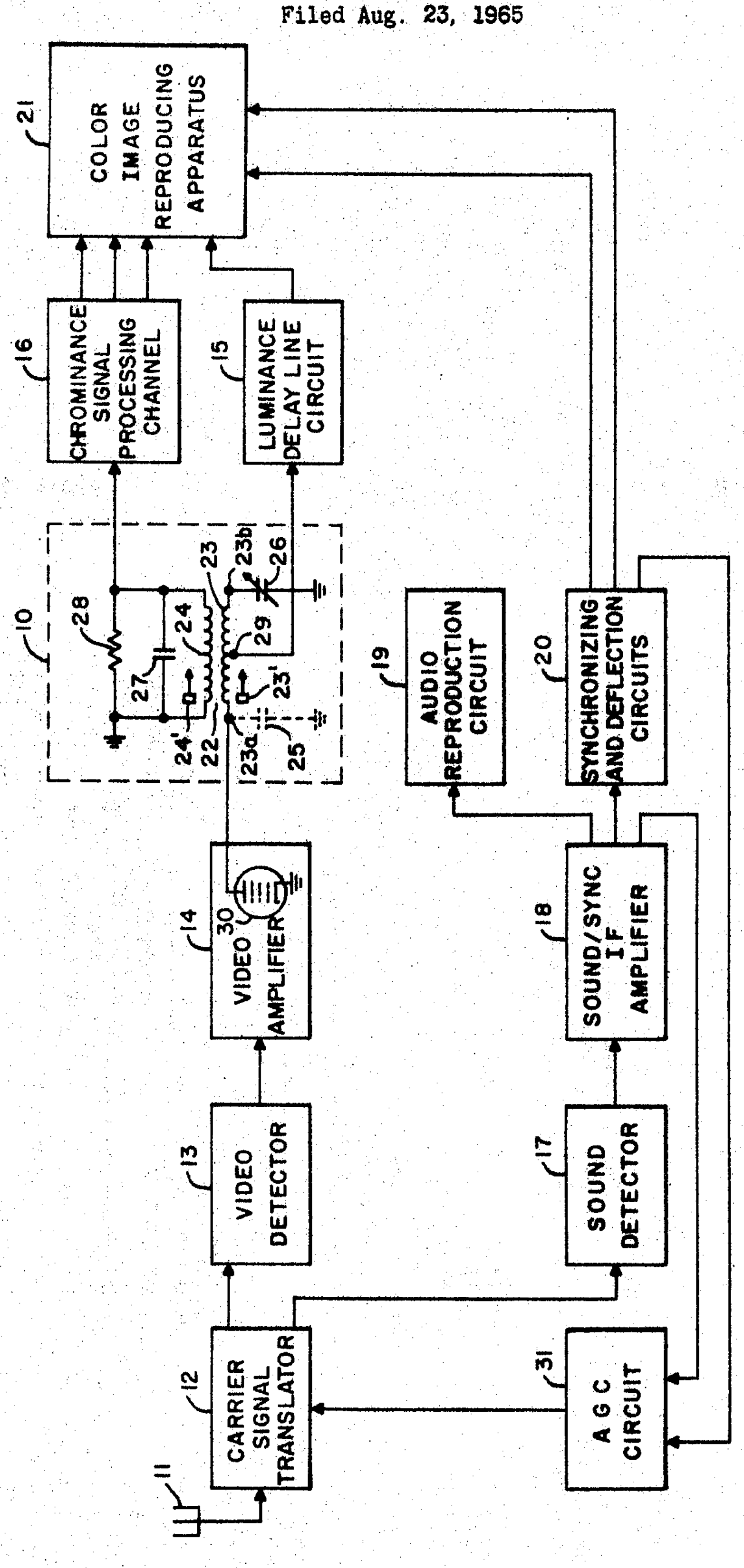

United States Patent Office 3,336,438

Patented Aug. 15, 1967

3,336,438

CHROMINANCE TAKEOFF CIRCUIT

Meyer Marks, Skokie, Ill., assignor to Hazeltine Research Inc., a corporation of Illinois Filed Aug. 23, 1965, Ser. No. 481,721
4 Claims. (Cl. 178—5.4)

This invention relates to a circuit for separaitng two signals between two outputs according to frequency. More particularly, this invention relates to a circuit, for use in a color-television receiver, for separating the chrominance signal from the luminance signal at the input to the luminance signal delay line which does not couple any reflected chrominance signal from the delay line circuitry to the chrominance channel.

In a color-television receiver, portions of the signal processing of the chrominance and luminance signals can be done through common circuitry to reduce cost and complexity. Both signals commonly are processed in the same RF amplifier, IF chain and video detector. However, in most prior receivers there is at least one stage of video amplification solely for luminance signals after separation of the chrominance and luminance signals. This amplifier has been required to provide isolation so that reflections or impedance variations caused by the luminance delay line do not disturb the chrominance signals.

Objects of this invention are therefore to provide new, simple and economical chrominance takeoff circuits and to provide such circuits which do not require a buffer stage between the takeoff circuit and the luminance delay line, but which substantially prevent coupling of reflected chrominance signals to the chrominance channel.

For a better understanding of the present invention together with other and further objects thereof, reference is had to the following description taken in connection with the accompanying drawing, and its scope will be pointed out in the appended claims.

*Description and operation of the invention*

Referring to the drawing there is shown a color-television receiver employing circuit means 10 constructed in accordance with the present invention. With the exception of the circuit means 10, which will subsequently be explained in detail, this is a conventional color-television receiver consisting of the antenna 11, carrier signal translator 12, video detector 13, video amplifier 14, luminance delay line circuit 15, chrominance signal processing channel 16, sound detector 17, sound/sync IF amplifier 18, audio reproduction circuits 19, synchronizing and deflection circuits 20, AGC circuit 31, and color image-reproducing apparatus 21. The construction of the individual circuits and their means for cooperating to reproduce the transmitted information is well-known and except as required to understand the present invention will not be explained in detail.

Referring more particularly to that portion of the drawing that illustrates the present invention, one output of the carrier signal translator 12 is connected to the video detector 13, thereby coupling the chrominance and luminance signals modulated on an intermediate-frequency carrier, to the video detector 13. The luminance signal and the chrominance signal are processed by the video detector 13 and separated from the intermediate-frequency carrier and coupled to the video amplifier 14. The video amplifier 14 includes one or more stages for amplifying the chrominance and luminance signals. The final stage includes an electron device, such as vacuum tube 30, to which is coupled the circuit means 10. The video amplifier provides amplified chrominance and luminance signals, the luminance signal having a bandwidth from 0–4 megacycles and the chrominance signal being phase and amplitude modulated on a 3.58 megacycle subcarrier.

Circuit means 10 includes primary transformer winding 23 of transformer 22 coupled to the output of the video amplifier 14. In the embodiment shown, end terminal 23*a* of the primary winding is coupled directly to the plate of the electron device 30. Terminal 23*a* is also coupled to ground through capacitance 25. Capacitance 25 may include a discrete capacitor, but it has been found that the interelectrode capacitance of the vacuum tube 30 together with stray capacitance provides sufficient capacitance. For this reason capacitance 25 is shown dotted. End terminal 23*b* of primary winding 23 is coupled to ground through capacitance 26. Capacitances 25 and 26 and primary winding 23 comprises a parallel resonant circuit which is tuned to resonate at the chominance signal subcarrier frequency of 3.58 megacycles.

The circuit means 10 also includes the secondary transformer winding 24 of transformer 22 which is inductively coupled to the primary winding 23. The secondary winding is resonated in the region of the chrominance signal frequency by capacitor 27. Resistor 28 is coupled between the terminals of the secondary winding to lower the Q of this circuit and thereby provide a broader bandwidth response.

Circuit means 10 also includes tap means 29 located between the end terminals of the primary winding 23. Tap means 29 located on the primary winding 23 at the point of minimum chrominance signal, couples the luminance signal to the color image-reproducing apparatus 21 by means of a luminance delay line circuit 15. The delay line circuit 15 delays the luminance signal a suffiicent amount so that it is coupled to the color image-reproducing apparatus at the same time as the corresponding color signals which are processed through the color signal processing channel 16.

Much of the difficulty in separating the luminance and chrominance signals arises as a result of the requirement for this delay line. In mass-producing color-television receivers it is virtually impossible to insure that the characteristic impedance of the delay line is perfectly matched at the output end in all receivers. The total input capacitance of the picture tube guns is a variable quantity, resulting from production differences in the picture tubes themselves and from variations in dressing of the wires between the output circuit and the picture tube. Also, there will be production variations in the termiating filter elements included in the luminance delay line circuit 15 such as the resistors, coils, etc.

As a result of this mismatch in delay line termination, reflections occur and appear at the input end of the line. With the conventional type of chrominance signal separation or takeoff circuit, these reflections alter the response characteristics of the takeoff circuit and produce echoes in the color difference signals, thereby adversely affecting the picture quality. It is therefore essential that there be a minimum amount of chrominance signal in the signal coupled to the luminance delay line circuit 15, not only to limit the chrominance signal reflected by the delay line but also because any chrominance signal in the luminance channel is undesirable because of its effect on the luminance signal. It is also essential that any chrominance signal reflected by the delay line be prevented from having a significant effect on the chrominance takeoff circuit.

In the embodiment of the invention illustrated in the accompanying figure, the amplified luminance and chrominance signals are coupled from the electron device 30 included in the video amplifier 14 to the input terminal 23*a* of primary transformer winding 23. The primary winding 23 forms a parallel resonant circuit with capacitances 25 and 26 and is tuned to the chrominance subcarrier frequency by adjustment of the variable capacitor 26 or the tuning slug 23′ in winding 23. It will be appreciated that the variable characteristic may be eliminated from either or both of these components at the sacrifice of some flexibility in the circuit. The chrominance signal which is developed across the primary winding 23 is inductively coupled to the secondary winding of the transformer 22. The secondary winding is resonated by the capacitor 27 and tuned to the region of the chrominance signal subcarrier by tuning slug 24′. The chrominance signal is then coupled to the chrominance signal processing channel 16 where it is utilized in the conventional manner to develop the color difference signals R–Y, B–Y and G–Y.

The luminance signal is coupled to the luminance delay line circuit 15 from a tap 29 located between the end terminals of the primary transformer winding 23. The primary winding 23 is resonated in the region of the chrominance signal frequency, it presents a low impedance to the luminance signal. The luminance signal is therefore coupled from the video amplifier 30 to the luminance delay line circuit 15 substantially unattenuated by circuit means 10.

The tap 29 is located on the primary winding at the point of minimum chrominance signal. With the capacitive leg of the resonant circuit, consisting of capacitances 25 and 26, grounded at a point between its end terminals 23*a* and 26*b*, it will be found that there exists a corresponding point along the length of the primary transformer winding 23 which is effectively at ground potential for the 3.58 megacycle chrominance signal subcarrier. This is the point of minimum chrominance signal and the point at which the tap 29 is located. In the video signal frequency range this point of minimum chrominance signal is at ground potential only at the chrominance signal subcarrier frequency. Therefore, there is some coupling of the chrominance signal sidebands to the luminance delay line circuit 15. However, the amplitude of these signals is low and they have no appreciable effect on the luminance signal coupled to the image-reproducing apparatus 21.

As previously noted, if the characteristic impedance of a delay line is not perfectly matched by its terminating impedance, as is the case with most receivers, there is some reflection of the low amplitude chrominance signal sidebands back to the primary transformer winding 23. However, these reflected signals are further attenuated upon return to the primary transformer winding 23 because the tap 29 provides a low impedance to ground at these frequencies. It can therefore be seen that circuit means 10 is so constructed and arranged that the signal coupled to the delay line circuit 15 is substantially free from components in the chrominance signal frequency range and the secondary transformer winding 24 is substantially free from reflected chrominance signals from said delay line.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a color-television receiver, including an electron device for amplifying both chrominance and luminance signals, a chrominance signal processing channel having an inherent delay relative to the luminance signal processing channel and an image reproducer, circuit means for separating the chrominance signal from the luminance signal comprising:

a primary transformer winding having one end coupled to said electron device;

capacitance means having its end terminals coupled to the end terminals of said primary transformer winding for forming a parallel resonant circuit in the chrominance signal frequency range;

a delay line, subject to undesirably reflecting any chrominance signals coupled to said delay line, for coupling luminance signals to said image reproducer with a delay compensating for said chrominance channel delay;

a ground connection intermediate the end terminals of said parallel resonant circuit comprising said primary transformer winding and said capacitance means;

tap means coupled to the point of minimum chrominance signal within said resonant circuit for supplying luminance signals to said delay line;

and a secondary transformer winding inductively coupled to said primary winding for absorbing signals in the chrominance signal frequency range and for supplying said signals to said chrominance channel;

the circuit means being so constructed and arranged that the signal coupled to said delay line is substantially free from signal components in the chrominance signal frequency range and said secondary winding is substantially free of reflected chrominance signals from said delay line.

2. In a color-television receiver, including an electron device for amplifying both chrominance and luminance signals, a chrominance signal processing channel having an inherent delay relative to the luminance signal processing channel and an image reproducer, circuit means for separating the chrominance signal from the luminance signal, comprising:

a primary transformer winding coupled to said electron device;

capacitance means, including first and second capacitances whose junction is coupled to ground, for forming with said primary winding a parallel resonant circuit in the chrominance signal frequency range;

a delay line, subject to undesirably reflecting any chrominance signals coupled to said delay line, for coupling luminance signals to said image reproducer with a delay compensating for said chrominance channel delay;

tap means, coupled to the point on said primary winding of minimum chrominance signal, for supplying luminance signals to said delay line;

and a secondary transformer winding inductively coupled to said primary winding for absorbing signals in the chrominance signal frequency range and for supplying said signals to said chrominance channel;

the circuit means being so constructed and arranged that the signal coupled to said delay line is substantially free from components in the chrominance signal frequency range and said secondary winding is substantially free of reflected chrominance signals from said delay line.

3. In a color-television receiver, including an image reproducer, circuit means for separating the chrominance signal from the luminance signal, comprising:

a video detector for supplying both chrominance and luminance signals;

an electron device coupled to said detector and arranged for amplifying both chrominance and luminance signals;

a delay line which undesirably reflects any chrominance signals coupled into said line, for coupling luminance signals to said image reproducer;

a chrominance signal processing channel which is undesirably disturbed by any chrominance signal coupled into said channel after reflection by said delay line, for processing chrominance signals prior to application to said image reproducer;

a primary transformer winding having first and second end terminals, said first end terminal being coupled to said electron device;

a first capacitance means, including the electron device interelectrode capacitance, coupled between said first end terminal of the primary winding and ground;

a second capacitance coupled between said second end terminal of the primary winding and ground, said first and second capacitances and the primary transformer winding tuned to form a parallel resonant circuit in the chrominance signal frequency range;

a tap connected to the point on said primary winding of minimum chrominance signal amplitude for coupling luminance signals to said delay line;

and a secondary transformer winding, inductively coupled to said primary winding and tuned to absorb signals in the chrominance signal frequency range, for supplying chrominance signals to said chrominance channel;

the circuit means being so constructed and arranged that said luminance channel is substantially free of chrominance signals and said chrominance channel is substantially free of chrominance signals reflected by said delay line.

4. A transformer circuit for separating signals between two output circuits, for coupling a band-pass signal to the first output circuit and a low-pass signal to the second output circuit and for isolating the first output circuit from the effects of impedance mismatch in the second output circuit, comprising:

a primary transformer winding to which the input signal is supplied;

capacitance means, coupled to said primary winding, for forming a parallel resonant circuit in the frequency range of said band-pass signal;

a tap coupled along the length of said primary winding for serving as an output for said low-pass signal;

a ground connection in said parallel resonant circuit for providing a low impedance path to ground at said tap means for the band-pass signal but not for the low-pass signal;

and a secondary winding, coupled to said primary winding, and tuned to absorb signals in the band-pass frequency range for serving as an output for said band-pass signal.

References Cited

UNITED STATES PATENTS

| | | | |
|---|---|---|---|
| 2,910,529 | 10/1959 | Splitt | 178—5.4 |
| 2,951,896 | 9/1960 | Schaefer | 178—5.4 |
| 3,114,889 | 12/1963 | Avins | 178—5.4 |

JOHN W. CALDWELL, *Acting Primary Examiner.*

J. A. O'BRIEN, *Assistant Examiner.*